United States Patent
Sherwani et al.

(10) Patent No.: US 10,625,156 B2
(45) Date of Patent: Apr. 21, 2020

(54) METHOD AND SYSTEM FOR SHARING VIDEO GAME CONTENT

(71) Applicant: SONY INTERACTIVE ENTERTAINMENT LLC, San Mateo, CA (US)

(72) Inventors: Adil Sherwani, Oakland, CA (US); Jonathan Webb, Sausalito, CA (US); Murray James Hume, Broxbourne (GB)

(73) Assignee: Sony Interactive Entertainment LLC, San Mateo, CA (US)

( * ) Notice: Subject to any disclaimer, the term of this patent is extended or adjusted under 35 U.S.C. 154(b) by 125 days.

(21) Appl. No.: 15/444,109

(22) Filed: Feb. 27, 2017

(65) Prior Publication Data
US 2018/0001194 A1 Jan. 4, 2018

Related U.S. Application Data

(60) Provisional application No. 62/357,114, filed on Jun. 30, 2016.

(51) Int. Cl.
| | |
|---|---|
| *A63F 13/87* | (2014.01) |
| *A63F 13/497* | (2014.01) |
| *A63F 13/79* | (2014.01) |
| *A63F 13/355* | (2014.01) |
| *A63F 13/35* | (2014.01) |

(52) U.S. Cl.
CPC .......... *A63F 13/355* (2014.09); *A63F 13/35* (2014.09); *A63F 13/497* (2014.09); *A63F 13/79* (2014.09); *A63F 13/87* (2014.09)

(58) Field of Classification Search
CPC .......... A63F 13/12; A63F 13/63; A63F 13/79; A63F 2300/6036; A63F 2300/6018; A63F 13/355
See application file for complete search history.

(56) References Cited

U.S. PATENT DOCUMENTS

| | | |
|---|---|---|
| 7,156,733 B2 | 1/2007 | Chiang et al. |
| 8,798,598 B2 | 8/2014 | Rossmann |
| 8,834,277 B2 | 9/2014 | Perry et al. |
| 9,050,535 B2 | 6/2015 | Kurtz et al. |
| 9,345,966 B2 | 5/2016 | Miura et al. |

(Continued)

OTHER PUBLICATIONS

Menotti, Videorec as gameplay: Recording playthoughs and video game engagement. Video Game Subcultures: pp. 81-92, 2012. [Retrieved from the Internet. URL:http://www.gamejournal.it/wp-content/uploads/2014/04/GAME_3_Subcultures_Journal_Menotti.pdf>. entire document.

(Continued)

*Primary Examiner* — David L Lewis
*Assistant Examiner* — Robert E Mosser
(74) *Attorney, Agent, or Firm* — Haverstock & Owens LLP

(57) ABSTRACT

A video game sharing method and system enables users to share playable video game segments with users so that the users are able to view the video game segments or interactively play the video game segments. When shared, state information for the video game segments is included such that the users begin in the same position with the same relevant statistics. By enabling video game sharing, user enjoyment and video game popularity are increased.

54 Claims, 7 Drawing Sheets

(56) References Cited

U.S. PATENT DOCUMENTS

| | | | |
|---|---|---|---|
| 2003/0030656 A1* | 2/2003 | Ang | G06F 16/284 |
| | | | 715/700 |
| 2007/0256541 A1 | 11/2007 | McCauley | |
| 2009/0118017 A1 | 5/2009 | Perlman et al. | |
| 2010/0056280 A1 | 3/2010 | Langan et al. | |
| 2011/0281638 A1 | 11/2011 | Bansi et al. | |
| 2013/0260896 A1* | 10/2013 | Miura | A63F 13/12 |
| | | | 463/42 |
| 2014/0004959 A1 | 1/2014 | Kahrs et al. | |
| 2014/0038721 A1 | 2/2014 | Archer et al. | |
| 2014/0179412 A1 | 6/2014 | Seabolt et al. | |
| 2014/0364228 A1 | 12/2014 | Rimon | |

OTHER PUBLICATIONS

International Search Report from PCT application No. PCT/US2017/032814.

Sameed Khan, What are iOS 6 Game Center Challenges & How Do you Send Them to Friends?, https://www.addictivetips.com/ios/what-are-iso-6-game-center-challenges-how-do-you-send-them/, Sep. 22, 2012, pp. 1-34.

* cited by examiner

METHOD AND SYSTEM FOR SHARING VIDEO GAME CONTENT

CROSS-REFERENCE TO RELATED APPLICATION(S)

This application claims priority under 35 U.S.C. § 119(e) of the U.S. Provisional Patent Application Ser. No. 62/357,114, filed Jun. 30, 2016 and titled, "PLAYSTATION NOW SHARED MOMENTS," which is hereby incorporated by reference in its entirety for all purposes.

FIELD OF THE INVENTION

The present invention relates to sharing content. More specifically, the present invention relates to sharing video game content.

BACKGROUND OF THE INVENTION

Sharing content is currently very popular. The way sharing content typically works is after a user views an interesting video or hears a song that he likes, the user sends an email or message to one or more friends, including a link to the content and commentary about the content. The one or more friends receive the message and select the link which enables the friends to watch/listen to the content. Messages, including re-sharing messages, then go back and forth between the friends and possibly additional friends. For video game sharing, users are able to share videos of video game segments, but simply sharing a video of a video game segment lacks important aspects of video gaming.

SUMMARY OF THE INVENTION

A video game sharing method and system enables users to share playable video game segments with users so that the users are able to view the video game segments or interactively play the video game segments. When shared, state information for the video game segments is included such that the users begin in the same position with the same relevant statistics. By enabling video game sharing, user enjoyment and video game popularity are increased.

In one aspect, a method programmed in a non-transitory memory of a device comprises processing a video game, recording state information for the video game of a first user and sharing the state information for the video game to a second device to enable a second user to play the video game based on the state information. The state information includes details related to the video game based on the first user playing the video game. The state information is captured at a beginning of a segment of the video game. The state information is captured periodically throughout a segment of the video game. The method further comprises recording a video of the first user playing the video game. The second user is limited to playing only a segment of the video game, wherein the segment of the video game is the segment the first user played and shared. Enabling the second user to play the video game includes determining if a second device of the second user has the video game locally accessible. Enabling the second user to play the video game includes streaming the video game from a network device. Sharing the state information includes sending a message from the first user to the second user. Sharing the state information includes initiating a competition with the second user. The second user plays the video game on a second device that is a different type of gaming console than the device of the first user.

In another aspect, a server device comprises a non-transitory memory for storing an application, the application for: processing a video game, streaming the video game to a first user, recording state information for the video game of the first user and sharing the state information for the video game of the first user to a second user to play the video game based on the state information and a processor coupled to the memory, the processor component configured for processing the application. The state information includes details related to the video game based on the first user playing the video game. The state information is captured at a beginning of a segment of the video game. The state information is captured periodically throughout a segment of the video game. The application is further for recording a video of the first user playing the video game. The second user is limited to playing only a segment of the video game, wherein the segment of the video game is the segment the first user played and shared. Enabling the second user to play the video game includes determining if a second device of the second user has the video game locally accessible. Sharing the state information includes sending a message from the first user to the second user. Sharing the state information includes initiating a competition with the second user.

In another aspect, a system comprises a first gaming console configured for playing a video game, capturing video game state information and sharing the video game and a second gaming console configured for receiving the video game state information from the first gaming console and playing a segment of the video game based on the video game state information from the first gaming console. The state information includes details related to the video game based on the first user playing the video game. The state information is captured at a beginning of a segment of the video game. The state information is captured periodically throughout a segment of the video game. The first gaming console is further configured for recording a video of the first user playing the video game. The second user is limited to playing only a segment of the video game, wherein the segment of the video game is the segment the first user played and shared. The second video game console is configured for determining if the second user has the video game locally accessible. Sharing the state information includes sending a message from the first user to the second user. Sharing the state information includes initiating a competition with the second user. The first gaming console has a different operating system than the second gaming console.

DETAILED DESCRIPTION OF THE PREFERRED EMBODIMENT

Figure 1:
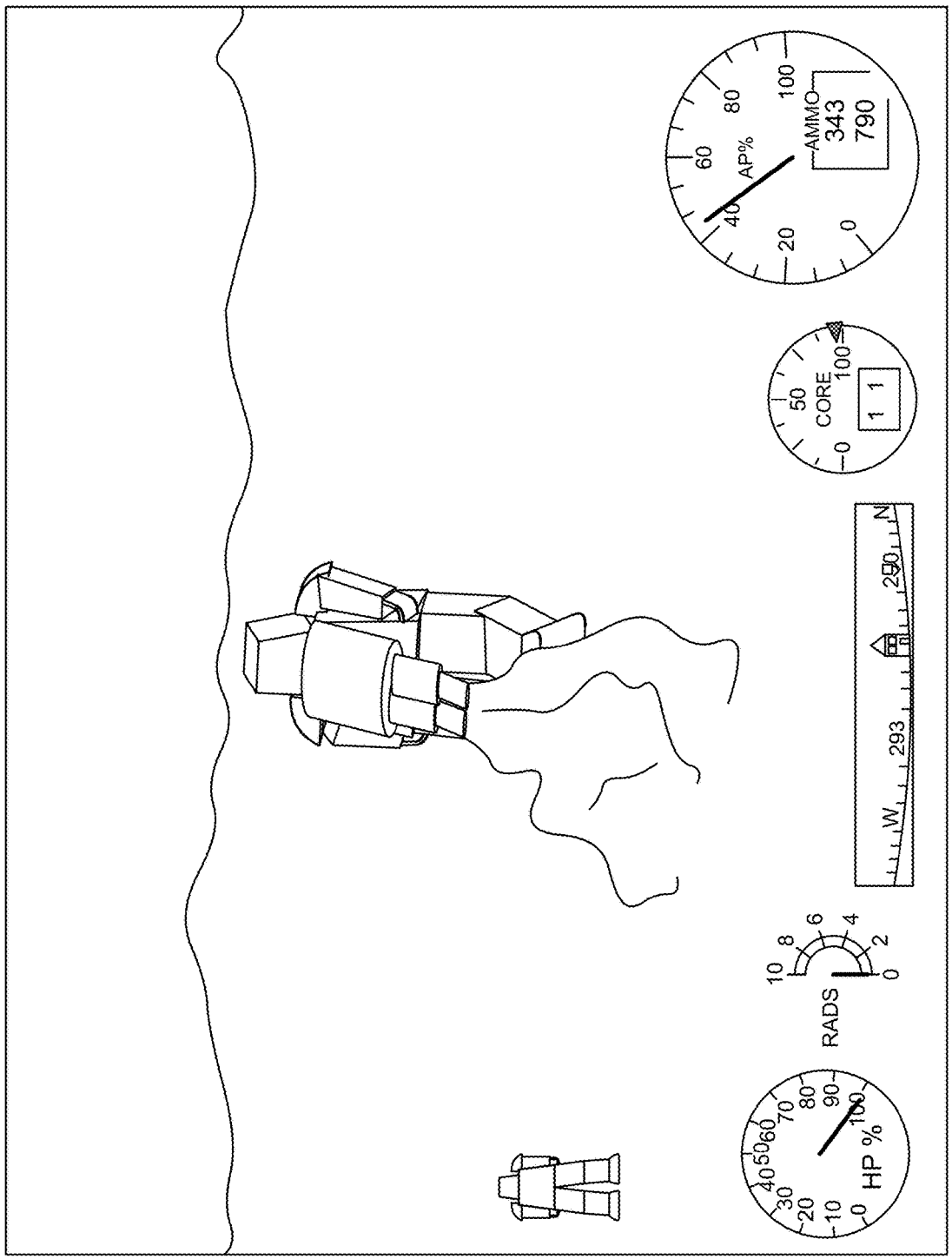
FIG. 1 shows an exemplary screenshot of a game according to some embodiments.

Sharing video game content without the video game content offering interactivity is a significant issue for the gaming community. If users receive a video of another gamer playing a video game, they may watch the video game segment and provide a comment, but the sharing and interaction is very limited. However, by providing the shared users the ability to play the video game at the video game segment which is shared increases the sharing interactivity dramatically. For example, a first user plays a video game, and shares a video game segment (e.g., playing Level X of Game Z) with his friends. With interactive sharing, each of the friends is then able to play the video game segment as well, and possibly compete with each other (e.g., to see who earns the most points, does it the fastest/most creatively, or any other competitive manner). The friends are then able to share their video game segments. The interactive sharing increases the level of sharing and the interest in sharing dramatically. Users much rather participate in gaming as opposed to simply watching others play. Further, users are able to learn from each other and pass on their knowledge/progress.

A system and method for providing asynchronous and synchronous game play experiences with one or more users is described herein. When a user wants to share game play scenarios, the user is able to select a predetermined portion of the game played and share that game play with selected users. The user is able to select a start/end position of the video of his own gameplay to share, and that video portion could contain multiple segments or start positions from which the recipient is able to start an interactive session. Thus, the first user would be selecting one or multiple starting points for the shared playable segments, but possibly not the ending points of those segments. Because playable segments are able to have multiple or potentially infinite ending points, it may not be possible for the first user to specify the ending point of the playable segment, even if he specifies an ending point of the video from which segments are able to be started. Also, in some embodiments, the system (console or game) may determine the likely portion that is playable, instead of allowing the first user to decide. The recipient is able to then either watch or play the exact game scene as sent by the sender. The user is able to play the game either online or offline (asynchronous). The recipient is also able to send the original game play received to selected recipients. The recipient is able to download the game if they do not currently have rights to the game. Alternatively, if the recipient is authorized to play the game (e.g. game already downloaded to device), then game play is initiated directly from the recipient's device. In some embodiments, the recipient receives only game state information to play that segment of the game without being able to watch a video of the first user's play session.

When a sender presses the SHARE button (or an equivalent/similar button), the system software communicates to the game via a Software Developer Kit (SDK) and asks for the current state. The game returns a state file, and a network device stores the state file along with the video URL (e.g. Youtube®), or the video is played on the gaming console. In some embodiments, the game constantly provides a state file (e.g., every second) so that the receiver is able to start playing the video game segment at any point during the video or live broadcast, not just at the beginning. On the receiver's side, the system software checks if the game is locally installed. If locally installed, system software tells the game to launch and passes in the state file to launch with. If not locally installed, system software contacts one or more servers and passes the state file up to the servers. The servers will then communicate to a network or user device (e.g., PS4) via the cloud, which will go through the PS4's system software to communicate to the game via SDK to launch with that state file. If the servers are not available in the user's location, a network device (e.g., PSN) will download the game and then launch it locally after it is downloaded.

FIG. 1 shows an exemplary screenshot of a game according to some embodiments. In the example, a user plays a jetpack scene/level of a game which the user considered to be very exciting. The user selects share (e.g., by pressing a "share" button on a device, using a "share" voice command, selecting "share" on the screen) to share the jetpack scene/level with other users.

Figure 2:
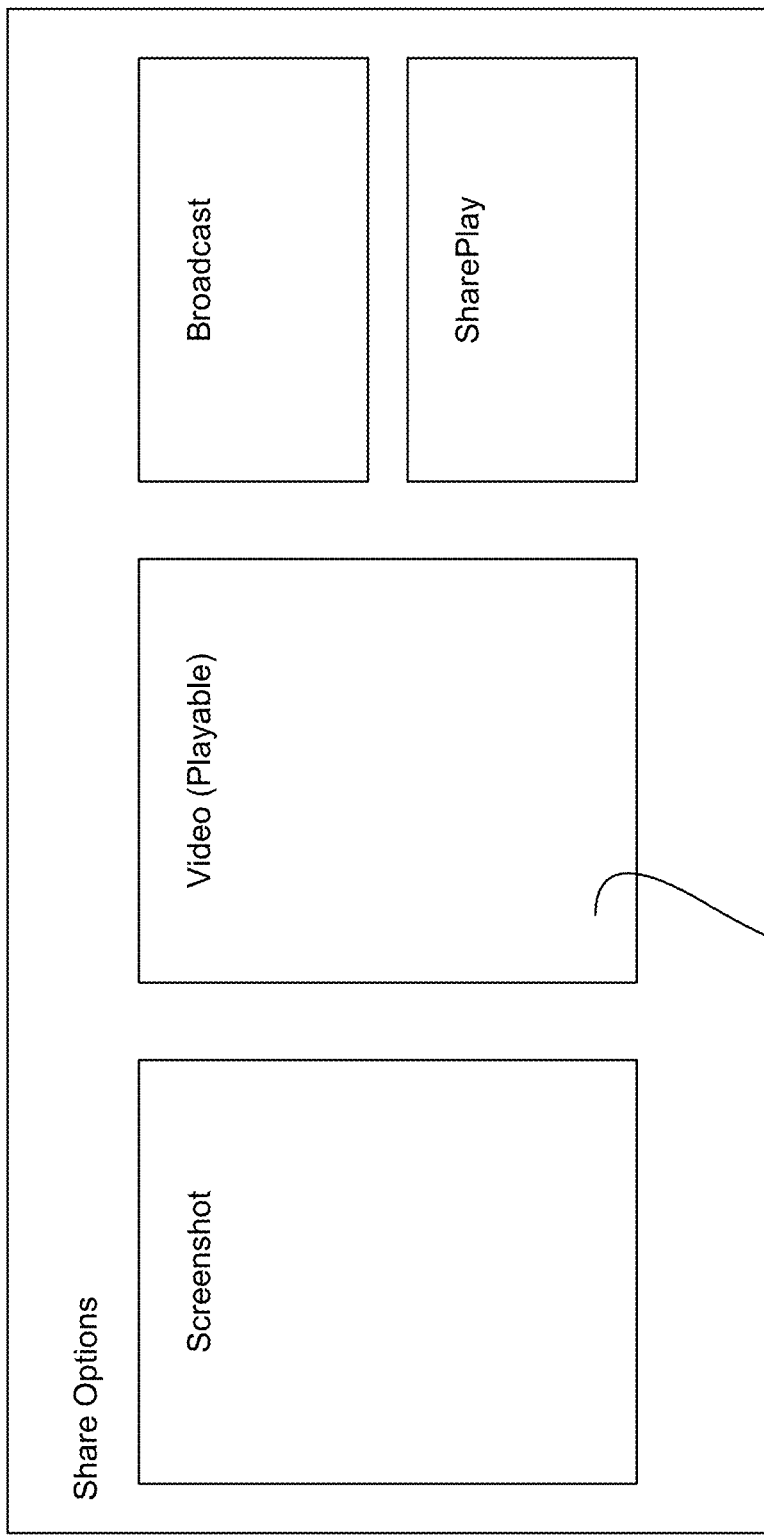
FIG. 2 shows an exemplary screenshot of share options according to some embodiments.

FIG. 2 shows an exemplary screenshot of share options according to some embodiments. The user is able to share a screenshot, a video, a playable video game 200, or another aspect. The playable video game 200 is not merely a video of a person playing a video game; rather, it enables the recipient to play the video game from the state of the video game as it is shared. State information of the user's (e.g., the sender's) video game is sent to enable other users to play the video game segment in the same state as was sent by the user. For example, if the user is on level 5, with 50% power remaining, and 15 bullets remaining, all of that information is stored and sent to the appropriate device to interpret the data to configure the recipient's video game to match. In some embodiments, the state information is updated repeatedly (e.g., every second) while the user is playing the video game, and each separate state information is stored. For example, a 10 minute playable video game segment would include 600 separate state information modules/data captures. Each state information module could include a range of information such as a single data point of the current level to more complex data points including current level, current screen position, energy level, enemy positions, doors open/closed, and so on. The state information is able to be stored locally and/or in the cloud. For example, when a recipient plays the shared video game segment, depending on where in the shared video game segment the user starts, the appropriate state information is accessed/retrieved from a network device or locally. For example, a server device stores a table which indicates for Shared Game X at time 00:00 is State 0 (meaning the data file or other storage implementation of the state information at time 00:00), and at time 00:01 is State 1, and so on.

Figure 3:
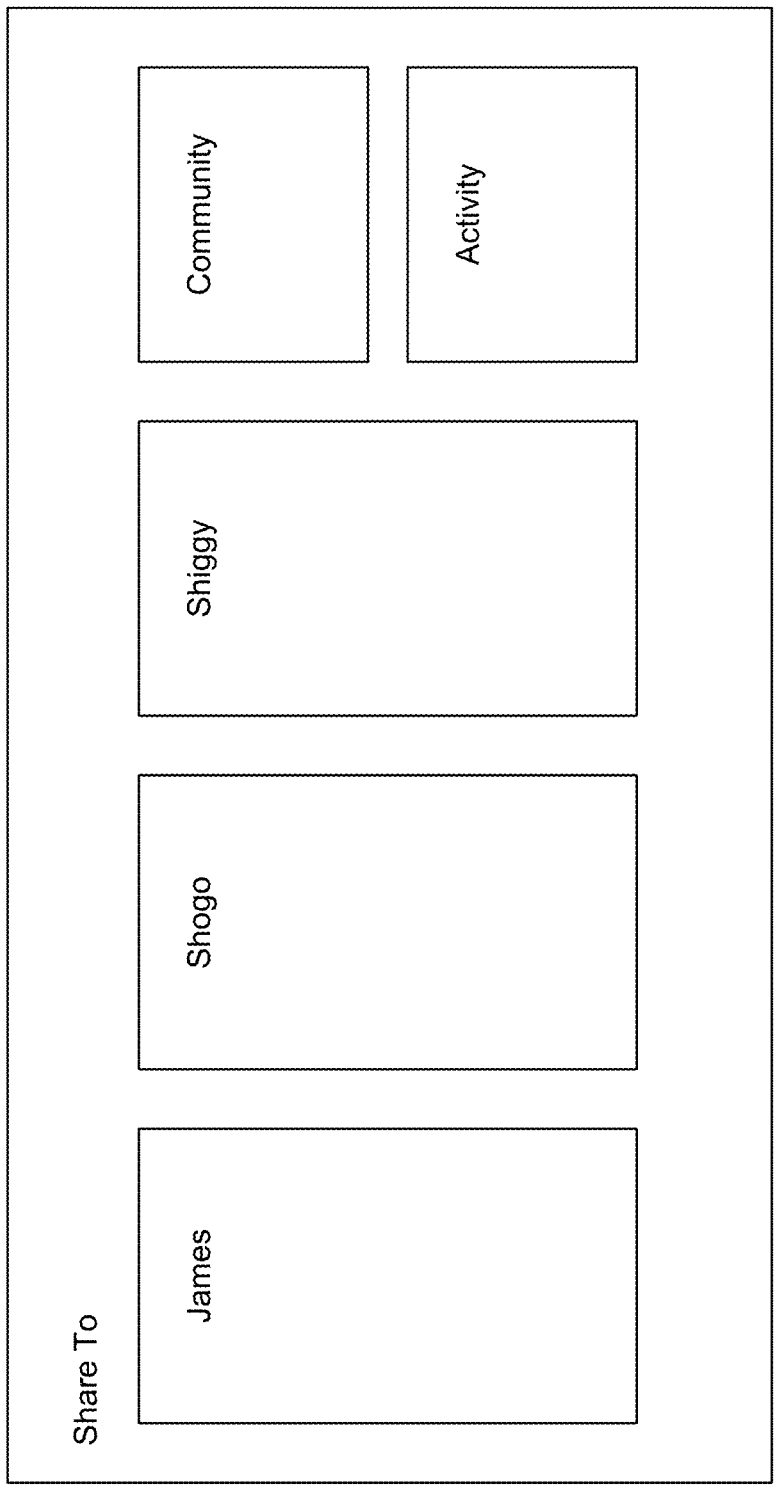
FIG. 3 shows an exemplary screenshot of contacts to share content according to some embodiments.

FIG. 3 shows an exemplary screenshot of contacts to share content according to some embodiments. The user is able to share the playable video game clip with any of his contacts. The user is able to share the video game with more than just contacts as well such as with the community or an activity feed. For example, the user is able to select to share the video with a friend with the username "Shiggy."

Figure 4:
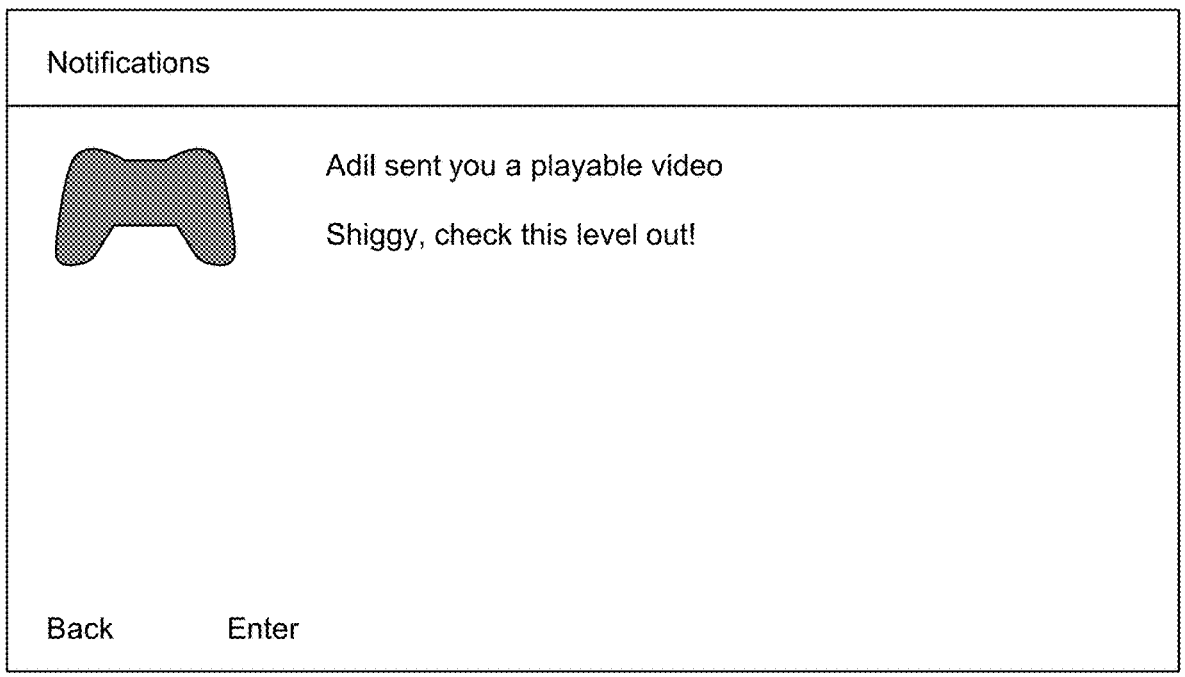
FIG. 4 shows an exemplary screenshot of a contact receiving a notification of shared content according to some embodiments.

FIG. 4 shows an exemplary screenshot of a contact receiving a notification of shared content according to some embodiments. The recipient is able to play the video game and/or watch a video of the sender playing the video game. Watching the sender play the video game plays a video of the sender playing the video game.

Depending on the implementation, when the recipient selects to play (as in interact with by participating) the playable video game (e.g., by clicking on a link), a system (e.g., a user device, a cloud device such as a server device) determines the recipient's access to the playable video game. In some embodiments, if the recipient has a local copy of the video game, then state information received from the sender is incorporated with the local copy of the video game, and the user plays the video game using that combination. In some embodiments, a network version (e.g., stored and streamed from a cloud service) of the video game is utilized with the state information from the sender. Thus, the recipient is able to play the shared video game by downloading the video game (while owning the video game or not) or by playing a networked/streamed version of the video game (while owning the video game or not). For example, if the recipient subscribes to a plus service, they are provided access to shared video game segments without having to pay for the video game itself.

The recipient of the video game launches into the start (or any part) of the scene. For example, if the sender shares the jetpack segment of Game X which includes a video of 15 minutes, the recipient is able to start at the beginning of the jetpack segment which corresponds to the 00:00 time of the video game or any time after up to the 15 minute end point of the video game segment. The recipient begins with the sender's state at the time selected. For example, if the recipient selects to start at the beginning of the shared video game segment, the sender had 5 grenades and 100% life, but at 1:30 of the video game segment, the sender had 3 grenades and 95% life, so the appropriate state is applied to the recipient, so he starts in the same position as the sender. However, the recipient plays using his own identification, not the sender's identification, so when the recipient is playing, anything that happens in the video game is attributable to him, not the sender. For further sharing purposes this is important, because then the recipient is able to further share his video game segment for purposes such as showing an alternative method or bragging. In some embodiments, the recipient is able to watch a video of the sender playing the video game segment, and then the recipient is able to play the video game segment.

In some embodiments, the recipient is limited in the amount of time he is able to play. For example, the recipient is only permitted to play a 15 minute segment of the video game starting from the selected point of the sender. For example, the sender shares a 15 minute video game segment, and the recipient is able to play from 00:00 or any other point, but the video game ends at the 15:00 mark regardless of the starting point. In some embodiments, the recipient is able to play without a limit for an endpoint. For example, a friend shares a video game segment starting on a level 5 boss. The recipient is able to start at the level 5 boss, and then continue until the end of the game.

The playable video game (or segment) is able to be shared asynchronously (e.g., the sender and recipient do not need to be online together). The playable video game is able to be shared with many contacts (e.g., all Facebook® contacts). The shared playable video game is able to be distributed/accessed through multiple channels such as communities, verified users, and social networks (e.g., Facebook®), and the features of these channels are able to be utilized such as rich profiles and trending information (e.g., a shared playable video game segment is increasing in popularity, so it is listed highly on a trending list). The shared playable video game is replayable by the recipient. For example, the recipient is able to play the video game segment shared by a friend several times to try to beat the friend's score, which may increase the recipient's desire to purchase the game. The shared playable video game is re-sharable such that the original shared playable video game is able to be shared and/or a recipient's playable video game is able to be shared. For example, User 1 shares a playable video game segment with User 2. User 2 is able to share User 1's playable video game segment with User 3. User 2 is also able to share his playable video game segment with User 3 in addition to or instead of User 1's playable video game segment. The shared playable video game is able to be shared across platforms. For example, if User 1 shares a playable segment from Game X on the PS4, but User 2 has a personal computer, the personal computer runs the personal computer version of Game X. The cross-platform gameplay is able to be provided by utilizing a conversion of state information for platforms (e.g., a relational database indicates the appropriate fields depending on the platform), and the appropriate state information is provided depending on the platform of the recipient. The recipient is able to utilize either a local game (e.g., downloaded to the recipient's device) or a streamed game that is on a platform's server.

In some embodiments, the recipient of the shared playable video game is very limited in what features are available. For example, the recipient is only able to play within the specifically shared segment (e.g., cannot play beyond a time limit such as 15 minutes, cannot travel to a different destination, cannot attempt a different mission). The recipient is not able to save the game or earn trophies. Shared videos/screenshots/games are marked to prevent false bragging (e.g., the sharer's name is indicated somewhere on the screen). All re-shares attribute back to the original sender. In some embodiments, the features available are able to be toggled by the sender of the playable video game.

In some embodiments, context or help is provided with the shared playable video game. For example, a button guide splash screen is provided so that if the user has never played the game before, the guide will enable them to play. A voice recording/memo is able to be provided by a sender to be played over/along with the game/video. For example, in addition to sending the playable video game, a recording of the user's voice is sent, so not only does the recipient see what the sender is doing in the video game, they are able to receive additional information. Furthering the example, the sender may perform a special move which the recipient may see on the playable video game, but the recipient may not know how to perform the special move, so in the recorded audio, the sender is able to specify to push buttons X, Y and Z at the same time to perform the special move. Similarly, other help is able to be provided such as game specific tips during the launch sequence or during gameplay and the sender's controller button sequence (overlaid on the video). For example, in the corner of the playable video game is a display of the input (e.g., control actions/buttons pressed) by the sender during his gameplay. The input is able to be automatically retrieved/recorded by the gaming system or another system while the sender is playing the video game which is then provided as/with the state information. The recipient and sender are able to schedule time to play a segment/scene together through a gaming interface. In some embodiments, game difficulty is adjustable. For example, a sender plays a video game on difficulty 10, but the recipient has never played the game before, so he begins on difficulty 1 (with 10 being much harder than 1), and the difficulty is displayed on the screen (particularly when the video game segment is shared). The recipient or the sender is able to adjust the difficulty, or the difficulty changes automatically depending on the success of the recipient. For example, if the recipient is successful at difficulty 1, then the segment is replayable at difficulty 2, and so on.

The playable video game segments are able to be shared for any purpose such as: a competition between the sender and the recipient, a learning experience, an informative experience (e.g., to play a rarely accessed side quest), a conversational experience, to increase interest/excitement, for enjoyment, for nostalgia, or any other purpose.

In operation, a video game system (e.g., the software, the console, and/or the network/server) identifies when a scene/segment (e.g., combat, setpiece) begins and saves a relevant state when the scene begins (or at other times) for a sender of the video game segment. The video game system for the recipient boots the game into the specified scene with a specified state as received from the sender. A network (e.g., PlayStation Network (PSN)) includes backend infrastructure to receive, store and access scene states. A client user interface indicates playable video games and offers the recipient to watch or play the playable video games. In some embodiments, the recipient is able to utilize online servers to implement an instant start of the shared playable video game which plays the shared playable video game segment without the game being downloaded on the recipient's console.

In some embodiments, to identify when a scene/segment begins, the backend (e.g., a server) assigns a scene identifier (ID) to some or all of: combat encounters, room/area entries, quest/mission starts, NPC conversations/encounters, setpiece entry points, and/or other game elements. The game (software and/or console) reports the scene identification and name as part of the Rich Presence (which is an existing API). The Rich Presence should have a scene ID. All shared screenshots/videos are tagged with a scene ID. Other implementations are possible.

A relevant state is saved when a scene begins. Relevant means anything that is used to replicate the sender's starting point (e.g., game level, energy level, ammunition amount, data based on previous game actions). In some embodiments, a saved state is optimized to remove irrelevant data. The irrelevant data is able to be determined manually or automatically. For example, an application includes data field information of what state information to keep and what state information to delete/not store, and the application tailors the state information based on the data field information to reduce the size of the state information. In some embodiments, a match concept is used with the Rich Session to use a save state as a match start. Captured video is able to be auto-cropped to scene boundaries which improves video sharing workflow for the end-user.

Metadata is included with state information. The metadata is used to present the scenes in a user-friendly manner. Strings identify the level, character, enemy, weapons and other information. Integers represent starting statistics: health, number of bullets, and more information. Metadata is able to be associated with the sender's video and its thumbnail image.

The state is updated as the scene/segment progresses. As the player moves around and completes tasks, the state information (e.g., active Match) is updated. As the player transitions to a new scene/segment, the scene ID is updated, and a new Match representation is generated. By updating the state dynamically during progress, the shared video is able to be more truly interactive, so a recipient is able to play the scene/segment at any point during the segment. In some embodiments, the user is able to toggle between watching/playing the shared playable video game. For example, User 1 shares a 10 minute segment from Game X with User 2. User 2 watches the first 3 minutes of the segment (that same as or similar to watching a video), and then starts playing the Game X segment at 3:01 of the segment until the segment ends. The transition from video to playable game is able to be implemented in any manner such as having a video and a playable game accessible, and if the user selects to watch the video, the video is displayed, and if the user selects to play the game, the playable video game is displayed/played. In some embodiments, the video and the playable video game are able to be synchronized in any manner such as tracking time between both, and for the video game, tracking state information periodically (e.g., every second), so that the user is able to switch back and forth between the video and the playable game. In some embodiments, users are not able to switch back and forth between the video and the playable game because when the user starts playing the playable game himself, his trajectory for the game will deviate from that shown in the video. In some embodiments, the video resumes from a position where the state most closely matches the state of the game, or the user is shown a different video from a different user which most closely matches the state of the game (and the video may then progress beyond that point).

In some embodiments, the outcome when a scene/segment ends is captured. As the player completes the scene, the active Match ends which includes capturing Match statistics such as score and time. By capturing outcome information, competitive scenarios are able to be implemented such as challenges. The challenges are able to be any type of challenge such as a skill challenge to beat each other's score or time on a level, or beat a boss faster, or a collection challenge to determine who obtains the most trophies, higher trophy completion percentage, the most collectibles (coins, skulls) in a game/segment.

Leader boards are able to be provided for any statistic in a game/segment such as score and time. Users are able to opt-in to post a skill challenge score/time on an activity feed such as posting to a feed when a user beats a boss and tagging friends to a challenge on a scene. Using a Rich Profile, a user is able to mark a friend as a rival for a specific game, and the system auto-tags the rival for all statistics generated in the game.

When a challenge is provided from a first user to a second user, the second user is able to accept the challenge in any manner such as via Live Detail or an Activity Feed (including auto-challenge). Active challenges are able to be listed/displayed in any manner including with notifications to the user. When a user (recipient) starts a skill challenge, the game is launched into the relevant scene including associating the gameplay for that session with the challenge, and if the game is not present (e.g., installed) on the console, the game is streamed from a network. When a user completes a challenge, a notification is sent to the person who challenged the user. For example, "User B just beat your score, play again to beat User B's score."

Each skill challenge is associated with a scene ID (e.g., boss, level), and each collectible challenge is associated with a dummy scene ID (e.g., coins). Match outcome data is included at the end of every match such as score, time, or number of head shots. For collection challenges the information is updated while the competition is ongoing. Each play in a competition has a unique result value, and then results are able to be compared to determine whose result is best. Players are able to compete against themselves or contacts. The aspects of the challenges are able to be implemented in any manner such as by the game, the console, the network or a combination of the software and devices. For example, the console with the game collects user accomplishments, and the network compares the accomplishments with other competitors.

In some embodiments, controller state is captured continuously. As the player presses buttons (or provides other input), the system captures that information. As described herein, the button information is able to be displayed to the recipient. The button stream is time-aligned with video and Scene/Match streams, which is able to be used for help and button guides by showing button presses as overlays on the video/game to explain controls.

In some embodiments, a recipient is able to utilize modified state information or state information with added information. For example, the recipient receives a game segment from a friend where the friend used Character X to play the game segment, but the recipient uses Character Z to play the game segment. The recipient starts the game segment with the same amount of power, in the same location, with the same ammunition, but with his selected character. Other modifications are able to be implemented as well. For example, since the character is different, the weaponry may be different as well. Any modifications/alterations are able to be implemented to increase user satisfaction. For example, the character selected may be one that the user is using in his game which the user has developed by playing the game such that instead of using the sender's Level 2 dwarf, the recipient is able to use his Level 10 wizard, but to play the same quest that the sender sent.

Figure 5:
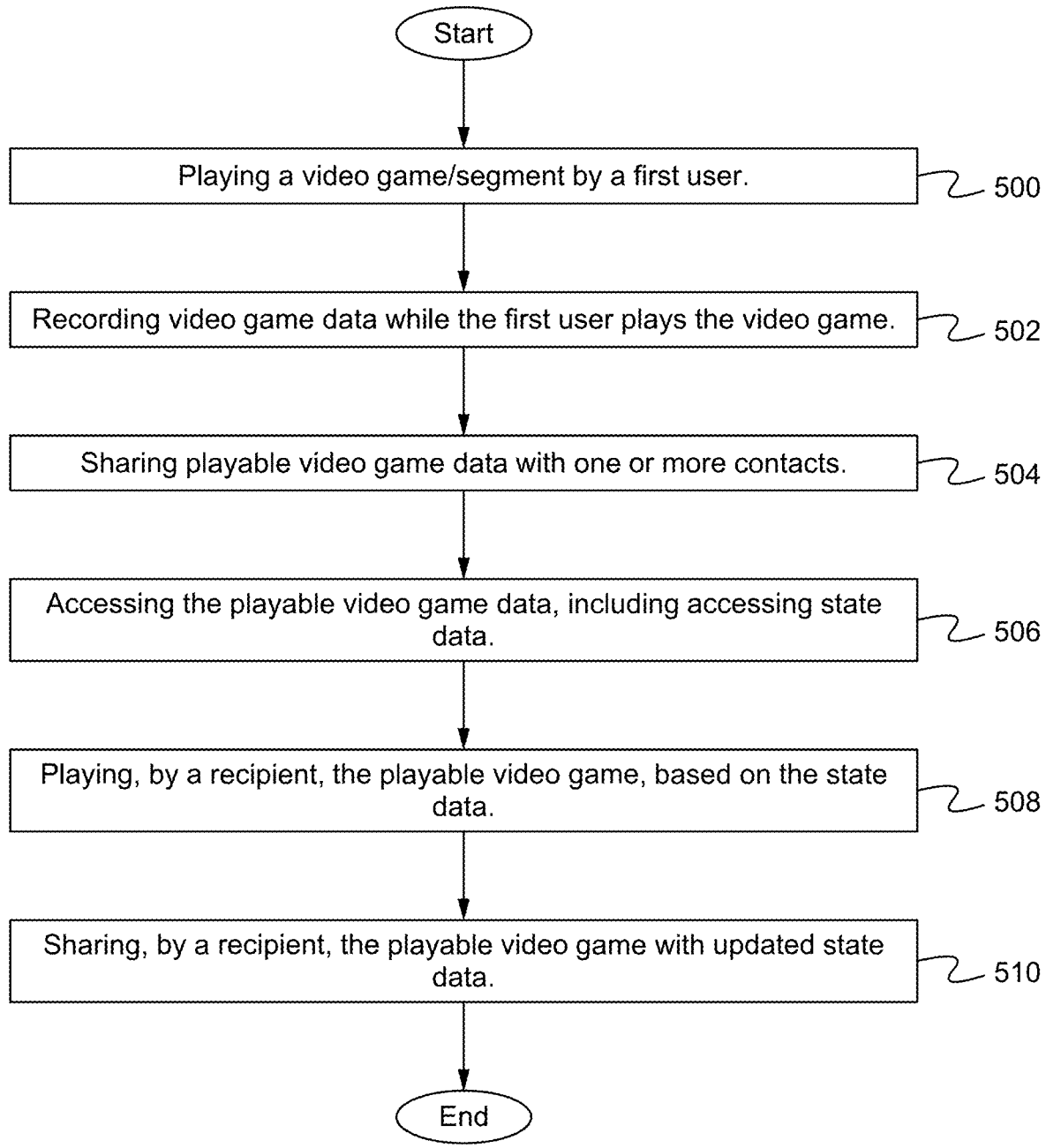
FIG. 5 illustrates a flowchart of a method of implementing video game sharing according to some embodiments.

FIG. 5 illustrates a flowchart of a method of implementing video game sharing according to some embodiments. In the step 500, a first user plays a video game/segment. For example, the first user plays a jetpack scene of Game X. In the step 502, a system records video game data while the first user plays the video game. For example, a PS4 console in cooperation with the video game software records state information (e.g., username information, life information, level information, and so on). In some embodiments, the state information is captured only at the beginning of a segment/scene such as at the beginning of the jetpack scene. In some embodiments, the state information is continuously captured (e.g., in 1 second intervals), so a recipient of the shared video game segment is able to begin at any point of the shared segment. In some embodiments, recording video game data includes recording a video of the gameplay. In some embodiments, a network device (e.g., a server on the PSN) records/stores the video game data such as the state information or the recorded video. In the step 504, the first user shares the playable video game segment with one or more additional users (e.g., recipients). The first user is able to share the video game segment in any manner such as sending a message to the additional users (e.g., via a social network or gaming network), and in the message includes a link to or other way of accessing the shared video game segment. In some embodiments, sharing the playable video game segment includes setting up a competition. For example, the first user inputs/selects a competition of defeating the boss the quickest, so the recipient of the shared playable video game tries to defeat the boss quicker than the first user. The recipient is able to watch a video of the shared video game segment and/or play the video game segment. In the step 506, upon selecting the shared playable video game segment, the system accesses the playable video game. Accessing the playable video game is able to depend on the implementation as well as the content available to the recipient. If the recipient owns (e.g., has downloaded or has on disc) the playable video game, then the state data from the first user is loaded, and the playable video game segment begins based on the state data (e.g., at the correct location of the video game and with the same amount of statistical information such as health, ammunition, and so on). If the recipient does not own the video game, the system accesses an online version of the video game (e.g., a streaming version of the video game where the video game processing occurs on a remote device based on the input received by the local device such as the user's PS4 console). The online version of the playable video game also utilizes the state information from the first user to start at the correct location with the correct amount of statistical information. In the step 508, the recipient plays the playable video game segment. While the recipient plays the playable video game, state information is recorded specific to the recipient and is stored for further sharing. The recipient is able to use the shared video game segment as he chooses (e.g., play the playable video game one or more times, watch the video of the first player playing the video game segment). In some embodiments, the recipient is limited in the number of times he plays the video game segment, the amount of time he plays the video game (e.g., limited to only a specific quest), and/or any other limitations. In some embodiments, the limitations are based on an access/ownership flag being set and/or other parameters. For example, if the recipient owns the video game or subscribes to a specific service, the recipient is able to play the playable video game segment and continue playing the video game beyond the video game segment. In some embodiments, the recipient is able to purchase the full game after playing the shared video game segment. In the step 510, the recipient is able to share his recorded video game data with one or more users (e.g., including the first user). For example, the recipient plays the shared playable video game, and his state information is shared with the first user. In some embodiments, other data is shared such as score information or other comparative information for competitive purposes. The sharing of the playable video game data is able to continue among users. In some embodiments, the order of the steps is modified. In some embodiments, fewer or additional steps are implemented.

Scene/segment data is related to specific encounters or sections of a game. While playing the game, a user is playing in a scene. In single-player games, every combat encounter, new room entry, quest start, NPC conversation, set-piece entry point and so on is a scene or triggers additional state information to be stored. For multi-player games, every unique map with unique game/match mode is a scene. A scene ID allows a system to boot to a specific scene/match/game mode, similar to a Universal Resource Locator (URL). On the backend, the system/network has a list of pre-defined scenes/game modes as scene IDs. The scene ID is a unique identifier for every scene in a game. The scene ID is able to be a number that maps to a pre-defined list of scenes for that game (e.g., if Game X has 184 scenes, the scene ID could be a number from 0 to 183). The scene IDs are able to be associated with meetings, challenges, matches, tournaments and/or any other implementation. Dynamic scene ID is able to support generation of competitions and others in-game. For example, while a user is playing a game, a scene is provided an ID including game state information, and a user is able to generate a competition based on the scene ID and state information while playing the game. Scene events are lightweight, extensible data about events that occur in the game. Scene states are able to be indicated using scene events. Scene states include a scene start, a scene update and a scene end. The scene start has a scene ID and other starting information (e.g., character state, world state). The scene update has any event/moment that occurs in-game. The scene end includes the outcome/result such as ending statistics. A scene significance is a game-specific score of how important a scene is in context.

On the platform/PSN side, varying structures and programs are utilized. For example, structures are able to be ranked, such that a very large number of leaderboards (including user-generated leaderboards) are able to be implemented. Media tagging includes marking up videos, images, games with scene ID, statistics and other information/moments. Tournaments are able to be implemented in any manner such as bracketed structures to organize matches, round-robin/Swiss tournaments, and real-time events or non-time-dependent events. Leagues are able to be implemented which may contain tournaments or standalone based on point-based rankings.

Figure 6:
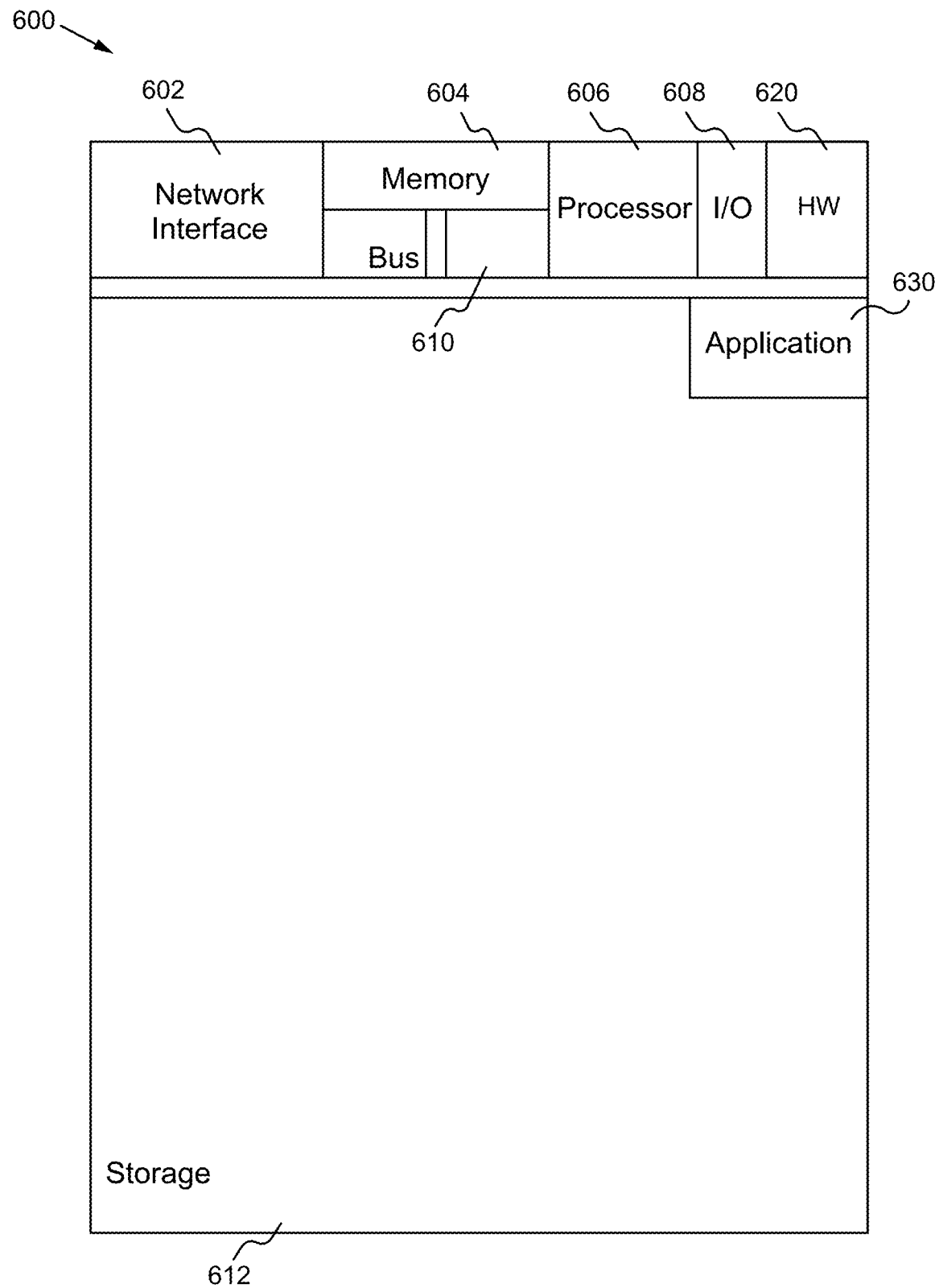
FIG. 6 illustrates a block diagram of an exemplary computing device configured to implement the video game sharing method according to some embodiments.

FIG. 6 illustrates a block diagram of an exemplary computing device configured to implement the video game sharing method according to some embodiments. The computing device 600 is able to be used to acquire, store, compute, process, communicate and/or display information such as images, videos, and video game content. In general, a hardware structure suitable for implementing the computing device 600 includes a network interface 602, a memory 604, a processor 606, I/O device(s) 608, a bus 610 and a storage device 612. The choice of processor is not critical as long as a suitable processor with sufficient speed is chosen. The memory 604 is able to be any conventional computer memory known in the art. The storage device 612 is able to include a hard drive, CDROM, CDRW, DVD, DVDRW, High Definition disc/drive, ultra-HD drive, flash memory card or any other storage device. The computing device 600 is able to include one or more network interfaces 602. An example of a network interface includes a network card connected to an Ethernet or other type of LAN. The I/O device(s) 608 are able to include one or more of the following: keyboard, mouse, monitor, screen, printer, modem, touchscreen, button interface and other devices. Video game sharing application(s) 630 used to perform the video game sharing method are likely to be stored in the storage device 612 and memory 604 and processed as applications are typically processed. More or fewer components shown in FIG. 6 are able to be included in the computing device 600. In some embodiments, video game sharing hardware 620 is included. Although the computing device 600 in FIG. 6 includes applications 630 and hardware 620 for the video game sharing method, the video game sharing method is able to be implemented on a computing device in hardware, firmware, software or any combination thereof. For example, in some embodiments, the video game sharing applications 630 are programmed in a memory and executed using a processor. In another example, in some embodiments, the video game sharing hardware 620 is programmed hardware logic including gates specifically designed to implement the video game sharing method.

In some embodiments, the video game sharing application(s) 630 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, smart jewelry (e.g., smart watch) or any other suitable computing device.

Figure 7:
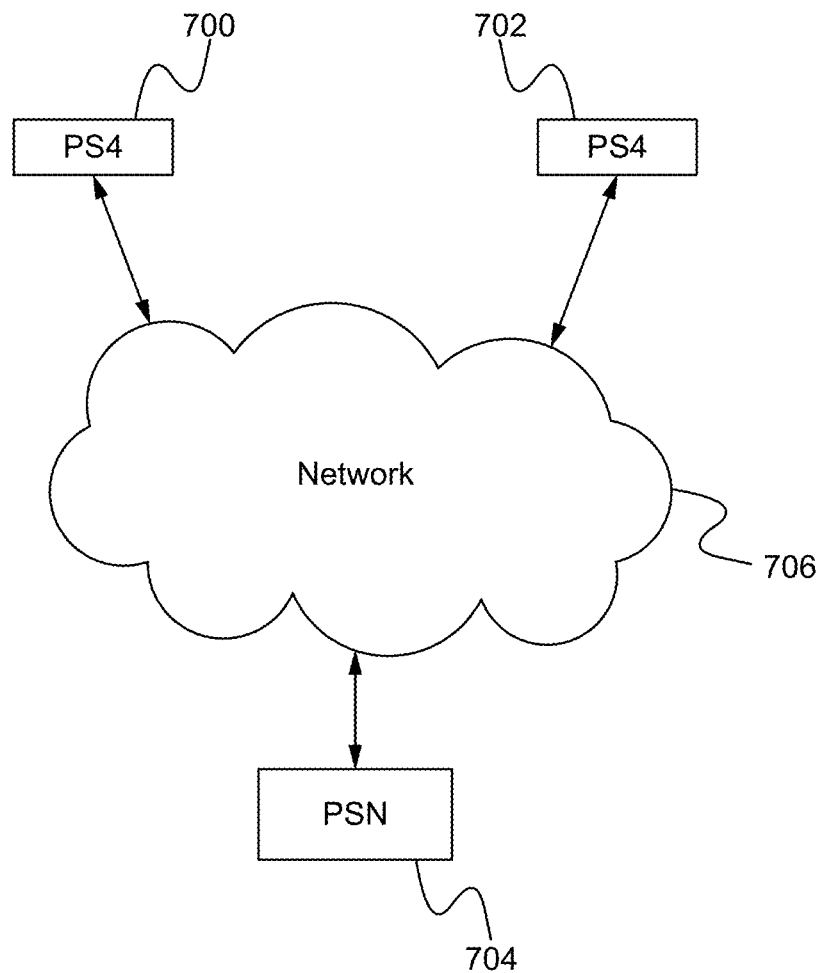
FIG. 7 illustrates a diagram of a network of devices according to some embodiments.

FIG. 7 illustrates a diagram of a network of devices according to some embodiments. The network of devices includes a first gaming console (e.g., PS4/Xbox) 700, a second gaming console (e.g., PS4/Xbox) 702, a network device (e.g., PSN server) 704 and a network 706. The network 706 is able to be any type of network such as a cellular network, wi-fi, the Internet or a combination thereof. The network of devices is able to include fewer or additional devices such as many gaming consoles or network devices. As described herein, a first user uses the first gaming console 700 to play and record a video game segment which is then shared with a second user who uses the second gaming console 702. Playable video game segment data (e.g., state information) is sent from the first gaming console 700 through the network 706 to the network device 704 and/or the second gaming console 702, depending on the implementation. The second user then uses the second gaming console 702 and/or the network device 704 to play the playable video game segment. For example, the second gaming console 702 plays software that is on/in the second gaming console 702 or streams the playable video game segment from the network device 704, and either implementation utilizes the state information acquired from the first gaming console 700. The playable video game segments are able to be captured/recorded for comparison/competitive purposes and are able to be shared back and forth between users or among other users.

In some embodiments, the first user plays/records the video game segment on the network device 704 which also records state information. For example, the first user streams the video game using the network device 704 which also captures state information and records the gameplay of the first user, and then the first user shares the video game segment (including state data) with the second user who is able to play the video game segment using the second gaming console 702 or the network device 704 by streaming similar to the first user.

To utilize the video game sharing method, users play, record and share video game segments. The system enables users to play a video game segment from a same starting point by using saved state information.

In operation, the video game sharing method and system enables users to: share single player game scenarios, implement dynamic help in single player games tied to a current game level, utilize statistics to implement communal competitions, and host structured competitive play events on an informal or formal basis. Users are able to share the experience of epic moments in a way that does not require simultaneous online presence and is repeatable. Users are able to receive more instructive help with gameplay—in-context tutorials are more comprehensive. Using the statistics, global rankings and competitions are able to be generated. Statistical information is able to include any information such as number of kills, headshots, deaths, kill/death ratio, number of wins, number of goals/points, number of assists, number of perfect wins, number of collectibles obtained, favorite weapon/map, favorite team/player, favorite character and any other statistic/information. The statistics/information are able to be gathered from the game in real-time via Scene Update and Scene End events, from a game server to a PSN server in real-time or a batch send, or in any other manner. Users are able to generate their own leagues and tournaments where users compete within a known context at a specified level. Sharing is elevated by taking advantage of the unique interactivity of games as a medium. Social networking benefits by users increasing their social connections to share and compete with additional users. Users are able to compete based on score, time or other game elements in single-player scenarios. Users are able to specify objectives of competitions (e.g., kill 2000 zombies). The system is able to track user history of competitions including competitors, scores, results and/or any other data. The system is able to capture significant moments that happen in-game, for personal collection, marking up shared items/broadcasts and sharing to the PSN or others. For example, when a user performs a high hit combination above a hit threshold, the scene is captured and shared. The playable game sharing enables more customization of the game, such as variable entry points in the system.

Although the video game sharing method and system has been described in relation to video game consoles, any digital/electronic video game (e.g., a smart phone app) is able to utilize the video game sharing method and system. Some Embodiments of a Method and System for Sharing Video Game Content 1. A method programmed in a non-transitory memory of a device comprising:
   processing a video game;
   recording state information for the video game of a first user; and
   sharing the state information for the video game to a second device to enable a second user to play the video game based on the state information.
2. The method of clause 1 wherein the state information includes details related to the video game based on the first user playing the video game.
3. The method of clause 1 wherein the state information is captured at a beginning of a segment of the video game.
4. The method of clause 1 wherein the state information is captured periodically throughout a segment of the video game.
5. The method of clause 1 further comprising recording a video of the first user playing the video game.
6. The method of clause 1 wherein the second user is limited to playing only a segment of the video game, wherein the segment of the video game is the segment the first user played and shared.
7. The method of clause 1 wherein enabling the second user to play the video game includes determining if a second device of the second user has the video game locally accessible.
8. The method of clause 1 wherein enabling the second user to play the video game includes streaming the video game from a network device.
9. The method of clause 1 wherein sharing the state information includes sending a message from the first user to the second user.
10. The method of clause 1 wherein sharing the state information includes initiating a competition with the second user.
11. The method of clause 1 wherein the second user plays the video game on a second device that is a different type of gaming console than the device of the first user.
12. A server device comprising:
   a non-transitory memory for storing an application, the application for:
   processing a video game;
   streaming the video game to a first user;
   recording state information for the video game of the first user; and
   sharing the state information for the video game of the first user to a second user to play the video game based on the state information; and
   a processor coupled to the memory, the processor component configured for processing the application.
13. The server device of clause 12 wherein the state information includes details related to the video game based on the first user playing the video game.
14. The server device of clause 12 wherein the state information is captured at a beginning of a segment of the video game.
15. The server device of clause 12 wherein the state information is captured periodically throughout a segment of the video game.
16. The server device of clause 12 wherein the application is further for recording a video of the first user playing the video game.
17. The server device of clause 12 wherein the second user is limited to playing only a segment of the video game, wherein the segment of the video game is the segment the first user played and shared.
18. The server device of clause 12 wherein enabling the second user to play the video game includes determining if a second device of the second user has the video game locally accessible.
19. The server device of clause 12 wherein sharing the state information includes sending a message from the first user to the second user.
20. The server device of clause 12 wherein sharing the state information includes initiating a competition with the second user.
21. A system comprising:
   a first gaming console configured for playing a video game, capturing video game state information and sharing the video game; and
   a second gaming console configured for receiving the video game state information from the first gaming console and playing a segment of the video game based on the video game state information from the first gaming console.
22. The system of clause 21 wherein the state information includes details related to the video game based on the first user playing the video game.
23. The system of clause 21 wherein the state information is captured at a beginning of a segment of the video game.
24. The system of clause 21 wherein the state information is captured periodically throughout a segment of the video game.
25. The system of clause 21 wherein the first gaming console is further configured for recording a video of the first user playing the video game.
26. The system of clause 21 wherein the second user is limited to playing only a segment of the video game, wherein the segment of the video game is the segment the first user played and shared.
27. The system of clause 21 wherein the second video game console is configured for determining if the second user has the video game locally accessible.
28. The system of clause 21 wherein sharing the state information includes sending a message from the first user to the second user.
29. The system of clause 21 wherein sharing the state information includes initiating a competition with the second user.

30. The system of clause 21 wherein the first gaming console has a different operating system than the second gaming console.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A game sharing method for enabling sharing and playing of portions of video games, the method comprising:
   processing a video game with a first device;
   sharing video information of a segment of the video game of a first user with the first device directly or indirectly to a second device;
   enabling a second user to select any point of the video information of the segment with the second device;
   sharing state information of the segment starting at the point selected by the second user with the first device directly or indirectly to the second device; and
   enabling the second user to begin playing of the segment at the point selected by the second user based on the state information with the second device.

2. The method of claim 1 wherein the state information includes details related to the video game based on the first user playing the video game.

3. The method of claim 1 wherein the state information is captured at a beginning of the segment of the video game.

4. The method of claim 1 wherein the state information is captured periodically throughout the segment of the video game.

5. The method of claim 1 further comprising recording a video of the first user playing the video game.

6. The method of claim 1 wherein the second device limits the playing to only the segment of the video game, wherein the segment of the video game is the segment the first user played and shared.

7. The method of claim 1 wherein enabling the playing of the segment of the video game includes determining if the second device has the video game locally accessible.

8. The method of claim 1 wherein enabling the playing of the segment of the video game includes streaming the video game from a network device.

9. The method of claim 1 wherein sharing the state information includes sending a message input by the first user from the first device to the second device and displaying the message on the second device.

10. The method of claim 1 wherein the second user plays the video game on a second device that is a different type of console than the device of the first user, and enabling cross-platform gameplay by converting the state information from a first platform to a second platform, wherein converting the state information utilizes a relational database indicating corresponding fields based on platform.

11. The method of claim 1, wherein the sharing of the video information is able to be one of a live streaming the video information from the first device to the second device and a transmission of the video information as previously recorded.

12. The method of claim 1, wherein the enabled playing is a separate session of the video game from an initial session of the video game from which the state information was collected.

13. The method of claim 1, wherein the enabling of playing includes presenting options on the second device, wherein selection of the options affects the playing of the segment.

14. The method of claim 1, further comprising:
   enabling adjustment of one or more parameters of the state information by the second device based on user input; and
   enabling playing of the segment of the video game with the second device based on the state information as adjusted.

15. The method of claim 1, wherein the state information is captured dynamically throughout the processing of the video game including during the segment with the first device.

16. The method of claim 1, wherein capturing the state information includes determining a scene identifier for each scene encountered in the processing of the video game, wherein the scene identifier identifies an environment of the scene in the video game.

17. The method of claim 1, wherein the enabled playing includes playing portions of the video game beyond an end of the segment.

18. The method of claim 1, wherein the state information comprises a current character level, a current screen position, current character attribute values and a current environment, current environment object states.

19. The method of claim 1, wherein the state information is shared indirectly to the second device via a server.

20. A device comprising:
   a non-transitory memory for storing an application, the application for:
      processing a video game;
      sharing state information for a segment of the video game of a first user;
      receiving video information of another segment of another video game of another user directly or indirectly shared by another device;
      enabling the first user to select any point of the video information of the another segment;
      receiving other state information of the another segment starting at the point selected by the first user directly or indirectly shared by the another device; and
      enabling the first user to begin playing of the another segment at the point selected by the first user based on the other state information; and
   a processor coupled to the memory, the processor component configured for processing the application.

21. The device of claim 20 wherein the state information includes details related to the video game based on the first user playing the video game.

22. The device of claim 20 wherein the state information is captured at a beginning of the segment of the video game.

23. The device of claim 20 wherein the state information is captured periodically throughout the segment of the video game.

24. The device of claim 20 wherein the application is further for recording a video of the first user playing the video game.

25. The device of claim 20 wherein the enabled playing is limited to playing only the another segment of the another video game.

26. The device of claim 20 wherein enabling the playing of the another segment of the another video game includes determining if the another video game is locally accessible.

27. The device of claim 20 wherein sharing the state information includes sending a message input by the first user to the another device and displaying the message on the another device.

28. The device of claim 20, wherein the sharing of the video information is able to be one of a live streaming the video information and a transmission of the video information as previously recorded.

29. The device of claim 20, wherein the enabled playing is a separate session of the another video game from an initial session of the another video game from which the other state information was collected.

30. The device of claim 20, wherein the enabling of playing includes presenting options, wherein selection of the options affects the playing of the another segment.

31. The device of claim 20, wherein the application is also for:
enabling adjustment of one or more parameters of the other state information based on user input; and
enabling playing of the another segment of the another video game based on the other state information as adjusted.

32. The device of claim 20, wherein the application is for capturing the state information dynamically throughout the processing of the video game including during the segment.

33. The device of claim 20, wherein capturing the state information includes determining a scene identifier for each scene encountered in the processing of the video game, wherein the scene identifier identifies an environment of the scene in the video game.

34. The device of claim 20, wherein the enabled playing includes playing portions of the another video game beyond an end of the another segment.

35. The device of claim 20, wherein the state information comprises a current character level, a current screen position, current character attribute values and a current environment, current environment object states.

36. The device of claim 20, wherein the other state information is indirectly shared by the another device via a server.

37. A system comprising:
a first console configured for playing a video game; and
a second console configured for playing the video game; wherein:
the first console is configured for sharing video information of a segment of the video game of a first user directly or indirectly to the second console;
the second console is configured for enabling a second user to select any point of the video information of the segment;
the first console is configured for sharing state information of the segment starting at the point selected by the second user directly or indirectly to the second console; and
the second console is configure for enabling the second user to begin playing of the segment at the point selected by the second user based on the state information.

38. The system of claim 37 wherein the state information includes details related to the video game based on the first user playing the video game.

39. The system of claim 37 wherein the state information is captured at a beginning of the segment of the video game.

40. The system of claim 37 wherein the state information is captured periodically throughout the segment of the video game.

41. The system of claim 37 wherein the first console is further configured for recording a video of the first user playing the video game.

42. The system of claim 37 wherein the second console limits the playing to only the segment of the video game, wherein the segment of the video game is the segment the first user played and shared.

43. The system of claim 37 wherein the second console is configured for determining if the second user has the video game locally accessible.

44. The system of claim 37 wherein sharing the video game state information includes sending a message input by the first user from the first console to the second console and displaying the message on the second console.

45. The system of claim 37 wherein the first console has a different operating system than the second console, and enabling cross-platform gameplay by converting the state information from a first platform to a second platform, wherein converting the state information utilizes a relational database indicating corresponding fields based on platform.

46. The system of claim 37, wherein the sharing of the video information is able to be one of a live streaming the video information from the first console to the second console and a transmission of the video information as previously recorded.

47. The system of claim 37, wherein the enabled playing is a separate session of the video game from an initial session from which the state information was collected.

48. The system of claim 37, wherein the enabling of playing includes presenting options on the second console, wherein selection of the options affects the playing of the segment.

49. The system of claim 37, wherein the second console is configured for enabling adjustment of one or more parameters of the state information based on user input and enabling playing of the segment based on the state information as adjusted.

50. The system of claim 37, wherein the first console captures the state information dynamically throughout the playing of the video game including during the segment.

51. The system of claim 37, wherein capturing the state information includes determining a scene identifier for each scene encountered in the playing of the video game, wherein the scene identifier identifies an environment of the scene in the video game.

52. The system of claim 37, wherein the enabled playing includes playing portions of the video game beyond an end of the segment.

53. The system of claim 37, wherein the state information comprises a current character level, a current screen position, current character attribute values and a current environment, current environment object states.

54. The system of claim 37, wherein the state information is shared indirectly to the second console via a server.

* * * * *